(12) United States Patent
Schwaegerl et al.

(10) Patent No.: US 9,403,246 B2
(45) Date of Patent: Aug. 2, 2016

(54) DRILL BIT AND METHOD FOR MANUFACTURING

(75) Inventors: Juergen Schwaegerl, Vohenstrauss (DE); Peter Sollfrank, Waldthurn (DE)

(73) Assignee: KENNAMETAL INC., Latrobe, PA (US)

( * ) Notice: Subject to any disclaimer, the term of this patent is extended or adjusted under 35 U.S.C. 154(b) by 742 days.

(21) Appl. No.: 13/576,858

(22) PCT Filed: Jan. 27, 2011

(86) PCT No.: PCT/US2011/022681
§ 371 (c)(1),
(2), (4) Date: Oct. 16, 2012

(87) PCT Pub. No.: WO2011/097109
PCT Pub. Date: Aug. 11, 2011

(65) Prior Publication Data
US 2013/0028677 A1    Jan. 31, 2013

(30) Foreign Application Priority Data

Feb. 4, 2010    (DE) .......................... 10 2010 006 796

(51) Int. Cl.
*B23B 51/02*    (2006.01)
*B23P 15/32*    (2006.01)
(Continued)

(52) U.S. Cl.
CPC ................ *B23P 15/32* (2013.01); *B23B 51/02* (2013.01); *B24B 1/00* (2013.01); *B24B 3/24* (2013.01);
(Continued)

(58) Field of Classification Search
CPC .............. B23B 51/02; Y10T 408/9097; Y10T 408/909

USPC ................................................. 408/230, 227
See application file for complete search history.

(56) References Cited

U.S. PATENT DOCUMENTS 465,392 A      12/1891  Shippee
500,213 A  *   6/1893   Richards ....................... 408/229
(Continued)

FOREIGN PATENT DOCUMENTS

CN        2231586 Y      7/1996
CN        1443619 A      9/2003
(Continued)

OTHER PUBLICATIONS

USPTO, English translations of Japan patent application publication, JP 63306811A, "Minidature Drill", Kaneko, Kazhhiro, Dec. 1988.*
(Continued)

*Primary Examiner* — Daniel Howell
*Assistant Examiner* — Chwen-Wei Su
(74) *Attorney, Agent, or Firm* — Larry R. Meenan

(57) ABSTRACT

A method for manufacturing a drill bit (1), wherein in a first step the chip flutes (12) are ground into a round rod, in a second step the round rod is ground down to its outer diameter (15, 16) with simultaneous grinding of the drill-bit back (13), and wherein in a third step the drill-bit front (4) is ground, and a drill bit (1) having at least one chip flute (12) and one secondary cutting edge and one drill-bit back (13) adjoining the secondary cutting edge, the drill-bit back (13) sloping downwards as the distance from the secondary cutting edge increases, in order to create a clearance that becomes continuously larger as the distance from the point of intersection (19) of the secondary cutting edge with the drill-bit back (13) increases.

5 Claims, 3 Drawing Sheets

(51) Int. Cl.
*B24B 1/00* (2006.01)
*B24B 3/24* (2006.01)
*B24B 19/02* (2006.01)

(52) U.S. Cl.
CPC ......... *B24B 19/022* (2013.01); *B23B 2251/244* (2013.01); *B23B 2251/54* (2013.01); *Y10T 408/9095* (2015.01)

(56) References Cited

U.S. PATENT DOCUMENTS

| | | | |
|---|---|---|---|
| 1,467,491 A | | 9/1923 | Oliver |
| 1,467,497 A | | 9/1923 | Philip |
| 2,457,132 A | * | 12/1948 | Delaney ........................... 72/64 |
| 2,936,658 A | | 5/1960 | Riley |
| 3,806,270 A | * | 4/1974 | Tanner et al. ................... 408/56 |
| 4,594,034 A | * | 6/1986 | Maier ........................... 408/230 |
| 4,602,900 A | * | 7/1986 | Arpaio et al. ................. 408/230 |
| 4,605,347 A | * | 8/1986 | Jodock et al. ................. 408/224 |
| 4,756,650 A | | 7/1988 | Wakihira et al. |
| 4,826,368 A | | 5/1989 | Tikal et al. |
| 4,913,603 A | | 4/1990 | Friedli et al. |
| 5,297,456 A | | 3/1994 | Nishimura |
| 5,931,615 A | | 8/1999 | Wiker |
| 5,951,214 A | | 9/1999 | Rothballer et al. |
| 6,045,301 A | | 4/2000 | Kammermeier et al. |
| 6,116,825 A | | 9/2000 | Kammermeier et al. |
| 6,210,083 B1 | | 4/2001 | Kammermeier et al. |
| 6,837,781 B2 | | 1/2005 | Hishiki |
| 6,988,859 B2 | | 1/2006 | Borschert |
| 7,252,461 B2 | | 8/2007 | Karonen |
| 7,275,856 B2 | | 10/2007 | Koetas et al. |
| 7,396,497 B2 | | 7/2008 | Koetas et al. |
| 7,435,364 B2 | | 10/2008 | James et al. |
| 2002/0159849 A1 | | 10/2002 | Longden et al. |
| 2003/0002941 A1 | | 1/2003 | Borschert et al. |
| 2003/0053874 A1 | * | 3/2003 | Moore .................. B23B 51/009 408/230 |
| 2003/0175086 A1 | | 9/2003 | Muhlfriedel et al. |
| 2005/0135887 A1 | | 6/2005 | Borschert et al. |
| 2005/0249562 A1 | | 11/2005 | Frejd |
| 2006/0228439 A1 | | 10/2006 | James et al. |
| 2006/0269372 A1 | | 11/2006 | Goshima |
| 2007/0071559 A1 | | 3/2007 | Koskinen |
| 2007/0237594 A1 | | 10/2007 | Lang et al. |
| 2008/0199268 A1 | | 8/2008 | Krenzer et al. |
| 2008/0232912 A1 | | 9/2008 | Bhagath |
| 2009/0016832 A1 | | 1/2009 | Onose et al. |
| 2009/0155004 A1 | | 6/2009 | Jansson |
| 2010/0260567 A1 | | 10/2010 | Kauper |
| 2011/0188956 A1 | | 8/2011 | Mueller et al. |
| 2012/0009034 A1 | | 1/2012 | Mack et al. |

FOREIGN PATENT DOCUMENTS

| | | | |
|---|---|---|---|
| CN | 2920492 Y | | 7/2007 |
| CN | 201147858 Y | | 11/2008 |
| DE | 9320448 U1 | | 7/1994 |
| DE | 4403300 A1 | * | 8/1995 |
| DE | 19807609 A1 | | 6/1999 |
| DE | 202005020829 | | 11/2006 |
| DE | 102006062429 A1 | | 7/2008 |
| DE | 102007050050 A1 | | 4/2009 |
| DE | 102008045326 A1 | | 2/2010 |
| DE | 102008049509 A1 | * | 3/2010 |
| DE | 102010006796 B4 | | 12/2011 |
| EP | 502541 A1 | | 9/1992 |
| EP | 672492 A1 | | 9/1995 |
| EP | 1230058 B1 | | 10/2003 |
| EP | 1294515 B1 | | 4/2005 |
| FR | 2885836 A1 | | 11/2006 |
| JP | 51-087794 U | | 7/1976 |
| JP | 57107716 A | * | 7/1982 |
| JP | S57-107716 | | 7/1982 |
| JP | 62068213 A | | 3/1987 |
| JP | 63093509 A | | 4/1988 |
| JP | 63306811 A | * | 12/1988 |
| JP | 01011703 A | | 1/1989 |
| JP | 08300214 A | | 11/1996 |
| JP | 09207007 A | | 8/1997 |
| JP | 2905555 B2 | | 3/1999 |
| JP | 11179611 A | | 7/1999 |
| JP | 2000084720 A | * | 3/2000 |
| JP | 2004001219 A | | 1/2004 |
| JP | 2004082248 A | * | 3/2004 |
| JP | 2006150553 A | | 6/2006 |
| JP | 2007-144526 A | | 6/2007 |
| JP | 2009-056534 A | | 3/2009 |
| SU | 1060342 A | * | 12/1983 |
| SU | 1808507 A1 | | 4/1993 |
| WO | 9635538 A1 | | 11/1996 |
| WO | 0136134 A1 | | 5/2001 |

OTHER PUBLICATIONS 03-11-2014-K-2935DECN1-OA.
Korean Intellectual Property Office, "International Search Report and Written Opinion", Oct. 26, 2011, 12 pp.
Office Action dated May 9, 2014 with Search Report.
Preliminary Search Report dated Jun. 20, 2014 with Written Opinion.
USPTO, "Office Action for U.S. Appl. No. 13/576,482", dated Mar. 3, 2015, 44 pp.
Oct. 16, 2015 Advisory Action (PTOL-303) 1 20130045058.
May 6, 2015 Office action (2 months) 102741014A.
Mar. 31, 2015 Search report 2955793.
Sep. 3, 2015 Final Office Action 20130045058.
US 20130045058, Mar. 3, 2015 Office action (3 months) 1 US 20130045058.

* cited by examiner

DRILL BIT AND METHOD FOR MANUFACTURING

BACKGROUND

1. Field of the Invention

The invention relates to a method for manufacturing a drill bit, and to a drill bit that is preferably manufactured by the method according to the invention.

2. Background Information

In the case of conventional methods for manufacturing drill bits, in particular twist drill bits, a round rod is first clamped at one end. The clamping is usually effected in a chuck. The clamped region of the round rod constitutes the subsequent clamping shank of the drill bit. In a first method step, the round rod is ground down to the desired dimensions, i.e. to the specified outer diameter of the drill bit. In a further operation, the chip flute is ground into the solid material of the round rod that has been brought to the desired dimensions. In a further method step, the flute back of the chip flutes is ground. In the grinding of the flute back, material is purposefully left to produce a support land or guide land on the flute back. Such a conventionally manufactured drill bit, having a guide land in the region of the flute back, is shown, for example, by EP-B-839 082.

While such conventional methods of manufacturing drill bits have been generally adequate, there is room for improvement in such methods, particularly in simplifying such methods.

SUMMARY OF THE INVENTION

Such improvement is realized in an inventive manner by the manufacture method as claimed in claim 1 and by the drill bit as claimed in claim 3. The claims that are dependent on claims 1 and 3 contain developments of the invention, some of which are advantageous and some of which are inventive per se.

A manufacturing method according to the invention consists substantially of three method steps. In the case of such a method according to the invention, a round rod is first clamped at an end. Preferably, this clamping is effected with the use of a chuck. In this case, the clamped region of the round rod at the same time constitutes the clamping shank of the subsequent drill bit. After the clamping of the round rod, a chip flute is ground into the round rod in the first method step. In this case, the grinding disc is set in relation to the round rod in such a way that its setting angle corresponds to the twist angle of the chip flute. If the drilling tool is a straight-fluted drilling tool, the grinding disc is aligned in the direction of the central longitudinal axis of the round rod.

For the second method step, the grinding disc is positioned transversely in relation to the then already fluted round rod. In the second method step, the grinding disc grinds the round bar to the desired dimensions. This means that, in the second method step, the round rod is ground down to the specified outer diameter. At the same time as the grinding down to the outer diameter, the drill-bit back is ground concomitantly. In a third method step, finally, the front of the drill bit is ground, i.e. the main cutting edges and a possible pointed portion.

The specification of a first method step, second method step and third method step in connection with the present invention is not to be understood such that the method steps always have to be performed in precisely the specified sequence. Rather, the sequence of the individual method steps can also be varied. Crucial to the invention is the fact that the grinding down to the specified outer diameter is at the same time combined with the grinding of the drill-bit back in a common method step.

Thus, compared with the conventional manufacture method according to the prior art, one method step is saved with the new type of method. The entire grinding process can be realized with one grinding disc in one set-up in an extremely short machining time. The time saving associated therewith is obvious.

For the purpose of grinding a drilling tool having two or more chip flutes, it is appropriate to make the chip flutes in succession in the round rod, and also to perform the machining of the respective drill-bit backs in a plurality of passes. In the case of a drilling tool having two or three chip flutes, a chip flute is in this case ground in its entirety into the round rod, in a first grinding pass. In the second method step, the drill-bit back is machined in a manner according to the invention, and the front of the drill bit is produced in a third method step. The drill bit is then turned round, in order to repeat the three method steps according to claim 1 for grinding in the second or third chip flute and for machining the second or third drill-bit back and for the second or third front grinding.

A drill bit manufactured with the use of the method according to the invention, set forth at the outset, has the peculiarity that no guide lands are realized in the region of the secondary cutting edges and in the region of the flute back between the secondary cutting edges. In order to prevent this new type of drill bit from becoming jammed, the flute back in each case slopes downwards as the distance from the secondary cutting edge increases, in order to create a clearance that becomes continually larger as the distance from the secondary cutting edge becomes greater. Such arrangement has the advantage that no unwanted build-up of material is produced in the region of the secondary cutting edges as a result of jammed-in chip material. Rather, the absence of guide lands in the region of the secondary cutting edges results in a lesser friction of the drill bit in the bore. This is because, during the drilling operation, the internal friction increases significantly because of accumulations of material, and in extreme cases can result in the failure of the tool. This is prevented in an effective manner by a drilling tool according to the invention.

In addition, the land-free structure of the drill bit in the region of the secondary cutting edges and of the flute backs assists the cooling emulsion in penetrating into the region of the drill-bit tip. The cooling and lubricating properties of the drill bit according to the invention are thus significantly improved in comparison with the prior art.

In order to prevent breaking-off or excessive wear of the main cutting edge, a protective land or an edge rounding can be provided in the region of the end of the main cutting edge and of the drill-bit outer envelope adjoining the same. This protective land can extend in the chip flute, out from the main cutting edge and along the secondary cutting edges.

In the case of a drill bit according to the invention, the drill bit front having the main cutting edges is first adjoined by the tip region in the region of the drill-bit envelope. The tip region, for its part, is next to the central region. The central region is consequently positioned between the tip region and the clamping shank of the drill bit. The tip region in this case has a larger outer diameter than the central region. The drill bit thus tapers from the drill-bit front towards the clamping shank. The precisely produced tip region having the larger diameter ensures the precise concentricity of the drill bit in the bore, while the central region, having a smaller outer diameter, results in a lesser internal friction of the finished drill bit.

The axial length of the tip region is not to exceed three times the amount of the outer diameter. Considered as particularly advantageous for the length of the tip region is the interval that corresponds to once the amount to double the amount of the outer diameter of the tip region. If, for example, the outer diameter of the drill bit is 10 mm, the interval of 10 mm to 20 mm is considered to be particularly advantageous for the axial length of the tip region.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
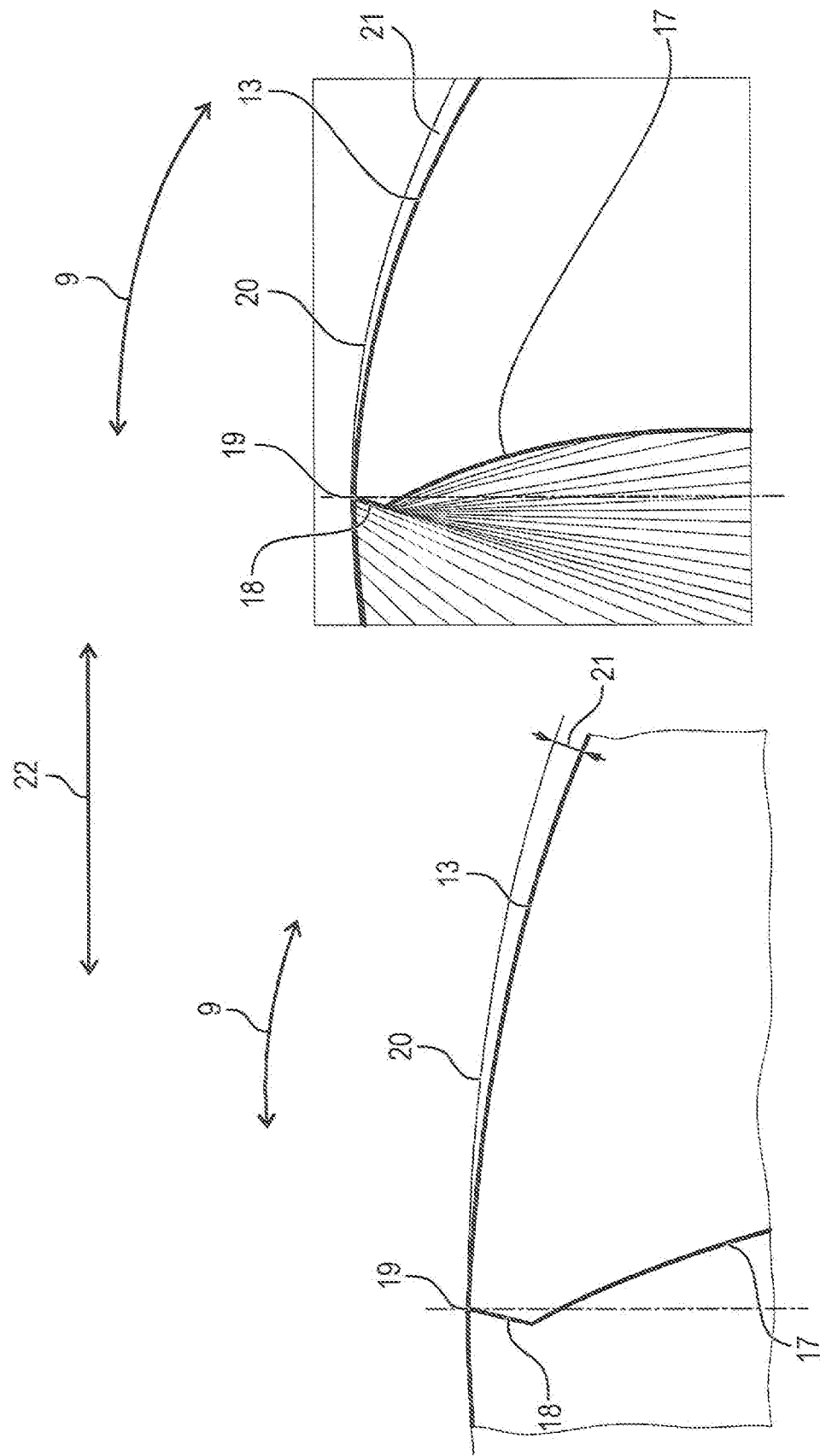
FIG. 1 shows the transition of the main cutting edge, with support land at the main cutting-edge end, to the drill-bit back sloping downwards according to the invention.

Referring to the FIGS., a drill bit 1, as viewed from the drill-bit front 4 in its axial direction 3 extending in the direction of its central longitudinal axis 2, is composed of three sub-regions, namely, the tip region 5, the central region 6 that adjoins the tip region 5, and the clamping shank 7 that, in turn, adjoins the central region 6. The drill bit is produced from a round rod. For the purpose of manufacturing the drill bit, the round bar is clamped by its one end, which constitutes the subsequent clamping shank 7, between the clamping jaws 8 of a tool chuck. The round rod clamped in the chuck by means of the clamping jaws 8 can then be turned in any manner in the rotation direction 9, about the central longitudinal axis 2.

Two cooling channels 10 extend through the drill bit 1. The cooling channels 10 extend through the drill bit 1 in the axial direction 3 and open out, in the region of the drill-hit front 4, into the cooling openings 11. The chip flutes 12 are ground into the envelope of the drill bit 1. The chip flutes 12 are each separate from the flute backs, or drill-bit backs 13. The axial length 14 of the tip region 5 preferably corresponds to twice the value of the large outer diameter 15. The large outer diameter 15 is the outer diameter 15 of the drill bit 1 in the region of the tip region 5. By contrast, the drill bit 1 has a smaller outer diameter 16 in the central region 6. In other words, the large outer diameter 15 in the region of the tip region 5 is larger than the smaller outer diameter 16 in the central region 6.

Figure 2:
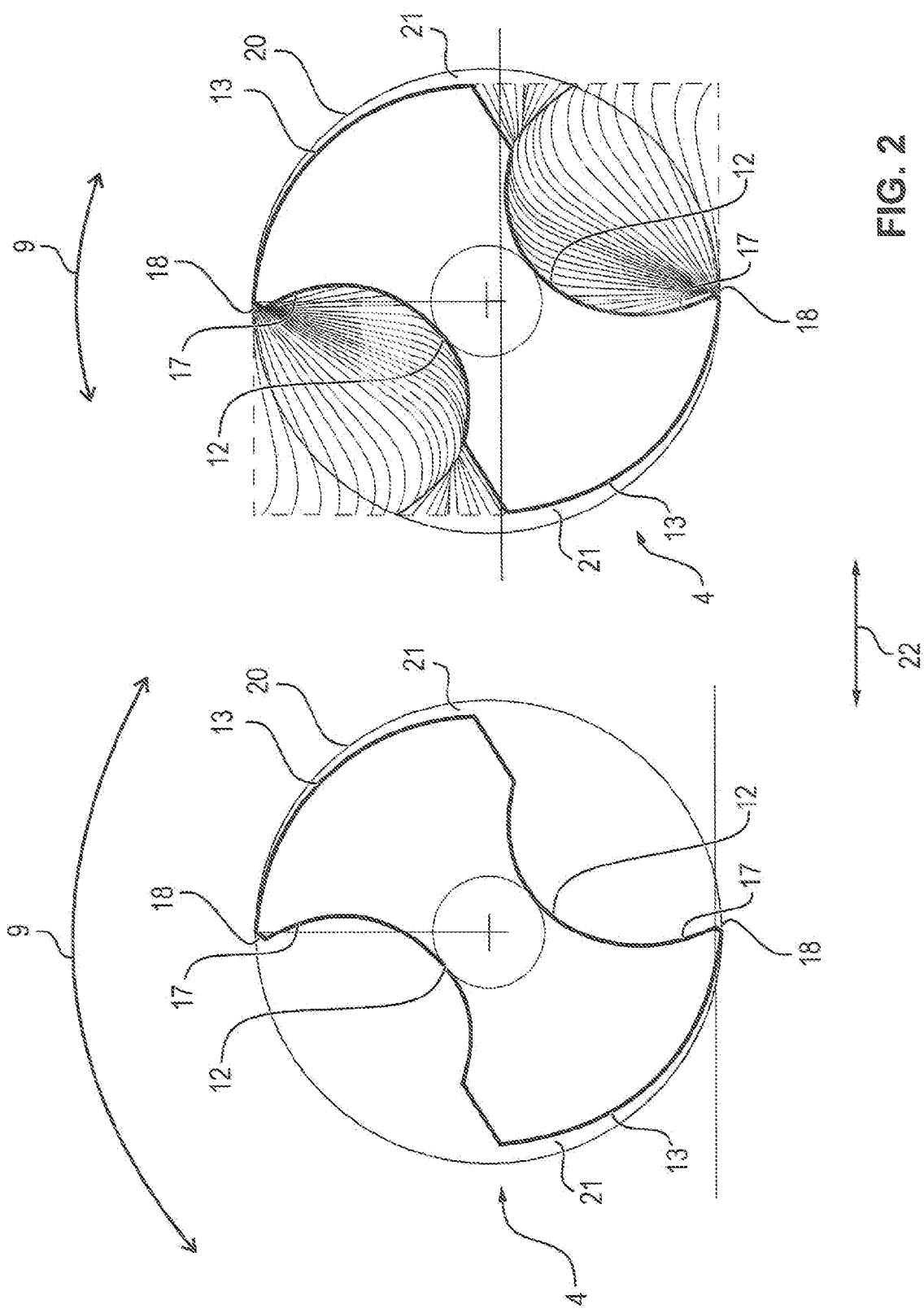
FIG. 2 shows a cross-sectional view of the drill-bit core of the drill bit according to the invention.
Figure 3:
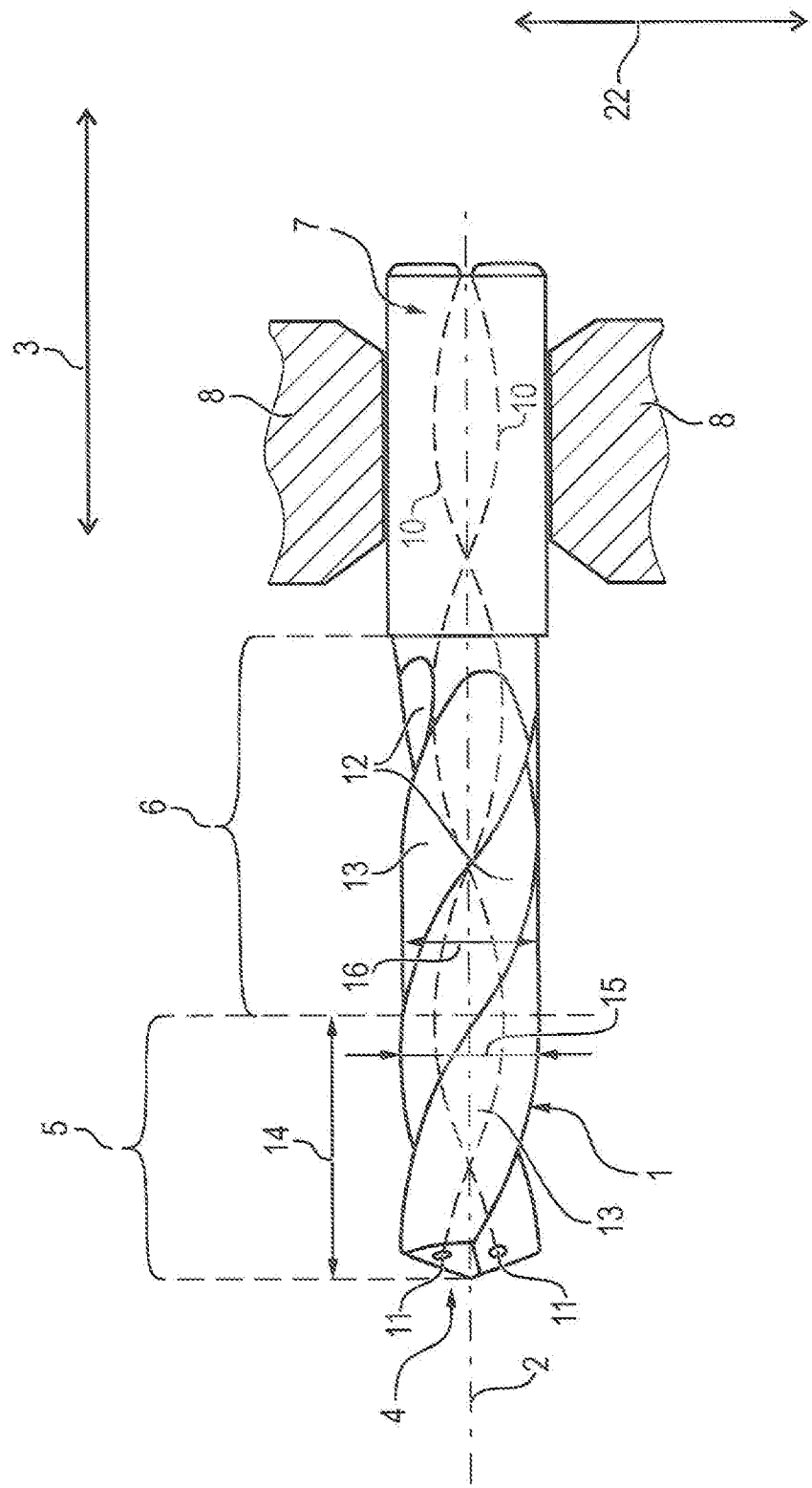
FIG. 3 shows, exemplarily, i.e. not to scale, the drill bit clamped in a chuck during manufacture, and the differing drill-bit regions produced as a result.

In the region of the drill-bit front 4, the main cutting edges 17 are realized on the drill bit 1. Protective lands 18 are in each case provided at the end regions of the main cutting edges 17. The downwardly sloping profile of the drill-bit back 13 can be seen in FIG. 1 and in FIG. 2. From the point of intersection 19 with the drill-bit secondary cutting edges, the drill-bit back 13 slopes continuously downwards, as a result of which the thereby produced clearance 21 becomes continuously larger in relation to the envelope line 20 of the drill bit 1.

In the case of the method according to the invention for manufacturing the drill bit 1 represented in the figures, the round rod constituting the drill-bit blank is first clamped between the clamping jaws 8 of the chuck by the subsequent clamping shank 7 of the drill bit 1. The grinding disc, not represented in the drawings, is then moved to the round rod at a setting angle corresponding to the twist angle of the chip flute 12, and thus grinds the chip flute 12 into the round rod. For the purpose of grinding the chip flute, the blank can also be rotated in the rotation direction 9, about the central longitudinal axis 2 of the drill bit 1.

For the purpose of grinding the drill-bit back 13 subsequently thereto, the grinding disc is positioned transversely, such that it rotates in the transverse direction 22 running at right angles to the axial direction 3. The grinding disc first grinds the drill-bit back 13 in the tip region 5. The tip region 5 is then finished in one or more grinding passes, including the front profile of the drill-bit front 4. The drill bit 1 in this case is clamped by its clamping shank 7 between the clamping jaws 8 of the chuck, and can be turned in any manner in the rotation direction 9 by means of the chuck. Once the drill bit 1 is finished in the region of the tip region 5, the drill bit 1 is ground down in the tip region 5 to the large outer diameter 15.

The central region 6 is then ground, the finish-ground central region 6 having a smaller outer diameter 16 than the tip region 5 having its large outer diameter 15.

What is claimed is:

1. A drill bit comprising:
   at least one chip flute,
   a main cutting edge, characterized by a protective land or an edge rounding at the end of the main cutting edge that faces towards an outer envelope of the drill-bit,
   a secondary cutting edge that flanks the chip flute, and
   a drill-bit back that adjoins the secondary cutting edge and extends directly therefrom in an arcuate manner,
   wherein the drill-bit back slopes smoothly downwards as the distance from the secondary cutting edge increases, in order to create a clearance that becomes continuously larger as the distance from the point of intersection of the secondary cutting edge with the drill-bit back increases.

2. The drill bit as claimed in claim 1, characterized by a negative chip angle between the chip flute and the drill-bit back.

3. The drill bit as claimed in claim 1, characterized by a clamping shank at one end, a central region that has a first outer diameter and that adjoins the clamping shank in the direction of the central longitudinal axis, and having a tip region that has a second outer diameter larger than the first outer diameter and that adjoins the central region in the direction of the central longitudinal axis.

4. The drill bit as claimed in claim 3, characterized by an axial length of the tip region that corresponds maximally to three times the second outer diameter.

5. The drill bit as claimed in claim 4, wherein the axial length of the tip region lies in the interval between once the amount and double the amount of the second outer diameter.

* * * * *